United States Patent
Chibon et al.

(10) Patent No.: US 12,069,149 B2
(45) Date of Patent: Aug. 20, 2024

(54) COMPUTING RESOURCE USAGE CONTROL USING SEED AND TOKEN GENERATION

(71) Applicant: Red Hat, Inc., Raleigh, NC (US)

(72) Inventors: Pierre-Yves Chibon, Paris la Defense (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 301 days.

(21) Appl. No.: 17/725,223

(22) Filed: Apr. 20, 2022

(65) Prior Publication Data

US 2023/0344918 A1 Oct. 26, 2023

(51) Int. Cl.
*H04L 67/60* (2022.01)
*H04L 9/40* (2022.01)

(52) U.S. Cl.
CPC ............ *H04L 67/60* (2022.05); *H04L 63/083* (2013.01)

(58) Field of Classification Search
CPC .... H04L 67/60; H04L 63/083; H04L 63/0807
See application file for complete search history.

(56) References Cited

U.S. PATENT DOCUMENTS

| | | | |
|---|---|---|---|
| 6,898,711 B1 | 5/2005 | Bauman et al. | |
| 8,880,239 B2 | 11/2014 | Kleve et al. | |
| 9,365,188 B1 | 6/2016 | Penilla et al. | |
| 9,688,247 B1 | 6/2017 | Jayaraman et al. | |
| 10,872,485 B2 | 12/2020 | Decke et al. | |
| 11,645,375 B2 * | 5/2023 | Yu | H04L 9/3213 713/185 |
| 11,843,546 B1 * | 12/2023 | Rule | H04L 47/822 |
| 2005/0154923 A1 * | 7/2005 | Lok | H04L 9/3213 726/19 |
| 2007/0061566 A1 * | 3/2007 | Bailey | H04L 9/0897 713/151 |
| 2007/0067833 A1 * | 3/2007 | Colnot | H04L 63/0853 726/9 |
| 2008/0270791 A1 * | 10/2008 | Nystrom | H04L 63/0807 713/155 |
| 2009/0172775 A1 * | 7/2009 | Mardikar | H04L 9/3228 726/2 |
| 2009/0300738 A1 * | 12/2009 | Dewe | H04L 63/18 713/176 |
| 2014/0129301 A1 | 5/2014 | Van Wiemeersch et al. | |

(Continued)

FOREIGN PATENT DOCUMENTS

| | | | | |
|---|---|---|---|---|
| CN | 108038763 A | 5/2018 | | |
| KR | 102317090 B1 | 10/2021 | | |
| WO | WO-2018037453 A1 * | 3/2018 | ............ | G06F 21/31 |

*Primary Examiner* — John B King
(74) *Attorney, Agent, or Firm* — Dority & Manning, P.A.

(57) ABSTRACT

A seed, a computing resource characteristic, and a computing resource permitted condition corresponding to the computing resource characteristic are received. A request is received from a requestor to implement a computing element that utilizes the computing resource characteristic. The request includes a computing resource value for the computing resource characteristic. A requestor token is received from the requestor. A server token is generated using the first seed. It is determined that the requestor token matches the server token, and that the computing resource value meets the computing resource permitted condition. In response, the request to implement the computing element is granted.

20 Claims, 4 Drawing Sheets

(56) References Cited

U.S. PATENT DOCUMENTS

| | | | |
|---|---|---|---|
| 2015/0244832 A1* | 8/2015 | Hirakata | H04L 67/02 709/217 |
| 2016/0191494 A1* | 6/2016 | Claes | H04L 9/3213 713/159 |
| 2021/0081923 A1* | 3/2021 | Rafferty | H04L 63/102 |

* cited by examiner

COMPUTING RESOURCE USAGE CONTROL USING SEED AND TOKEN GENERATION

BACKGROUND

Shared computing environments, such as a cloud computing environment, may have different usage limitations for different tenants of the cloud computing environment.

SUMMARY

The examples disclosed herein implement computing resource usage control using seed and token generation.

In one example a method is provided. The method includes receiving, by a computing system comprising one or more processor devices, a first seed, a first computing resource characteristic, and a first computing resource permitted condition corresponding to the first computing resource characteristic. The method further includes, subsequent to receiving the first seed, receiving, by the computing system, a first request from a first requestor to implement a first computing element that utilizes the first computing resource characteristic, the first request including a first computing resource value for the first computing resource characteristic. The method further includes receiving, by the computing system from the first requestor, a first requestor token. The method further includes generating, by the computing system, using the first seed, a first server token. The method further includes determining, by the computing system, that the first requestor token matches the first server token. The method further includes determining, by the computing system, that the first computing resource value meets the first computing resource permitted condition. The method further includes, in response to determining that the first requestor token matches the first server token and determining that the first computing resource value meets the first computing resource permitted condition, granting, by the computing system, the first request to implement the first computing element.

In another example a computer system is provided. The computer system includes one or more processor devices of one or more computing devices. The one or more processor devices are to receive a first seed, a first computing resource characteristic, and a first computing resource permitted condition corresponding to the first computing resource characteristic. The one or more processor devices are further to, subsequent to receiving the first seed, receive a first request from a first requestor to implement a first computing element that utilizes the first computing resource characteristic, the first request including a first computing resource value for the first computing resource characteristic. The one or more processor devices are further to receive, from the first requestor, a first requestor token. The one or more processor devices are further to generate, using the first seed, a first server token. The one or more processor devices are further to determine that the first requestor token matches the first server token. The one or more processor devices are further to determine that the first computing resource value meets the first computing resource permitted condition. The one or more processor devices are further to, in response to determining that the first requestor token matches the first server token and determining that the first computing resource value meets the first computing resource permitted condition, grant the first request to implement the first computing element.

In another example a non-transitory computer-readable storage medium is provided. The non-transitory computer-readable storage medium includes executable instructions to cause one or more processor devices of one or more computing devices to receive a first seed, a first computing resource characteristic, and a first computing resource permitted condition corresponding to the first computing resource characteristic. The instructions further cause the one or more processor devices to, subsequent to receiving the first seed, receive a first request from a first requestor to implement a first computing element that utilizes the first computing resource characteristic, the first request including a first computing resource value for the first computing resource characteristic. The instructions further cause the one or more processor devices to receive, from the first requestor, a first requestor token. The instructions further cause the one or more processor devices to generate, using the first seed, a first server token. The instructions further cause the one or more processor devices to determine that the first requestor token matches the first server token. The instructions further cause the one or more processor devices to determine that the first computing resource value meets the first computing resource permitted condition. The instructions further cause the one or more processor devices to, in response to determining that the first requestor token matches the first server token and determining that the first computing resource value meets the first computing resource permitted condition, grant the first request to implement the first computing element.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
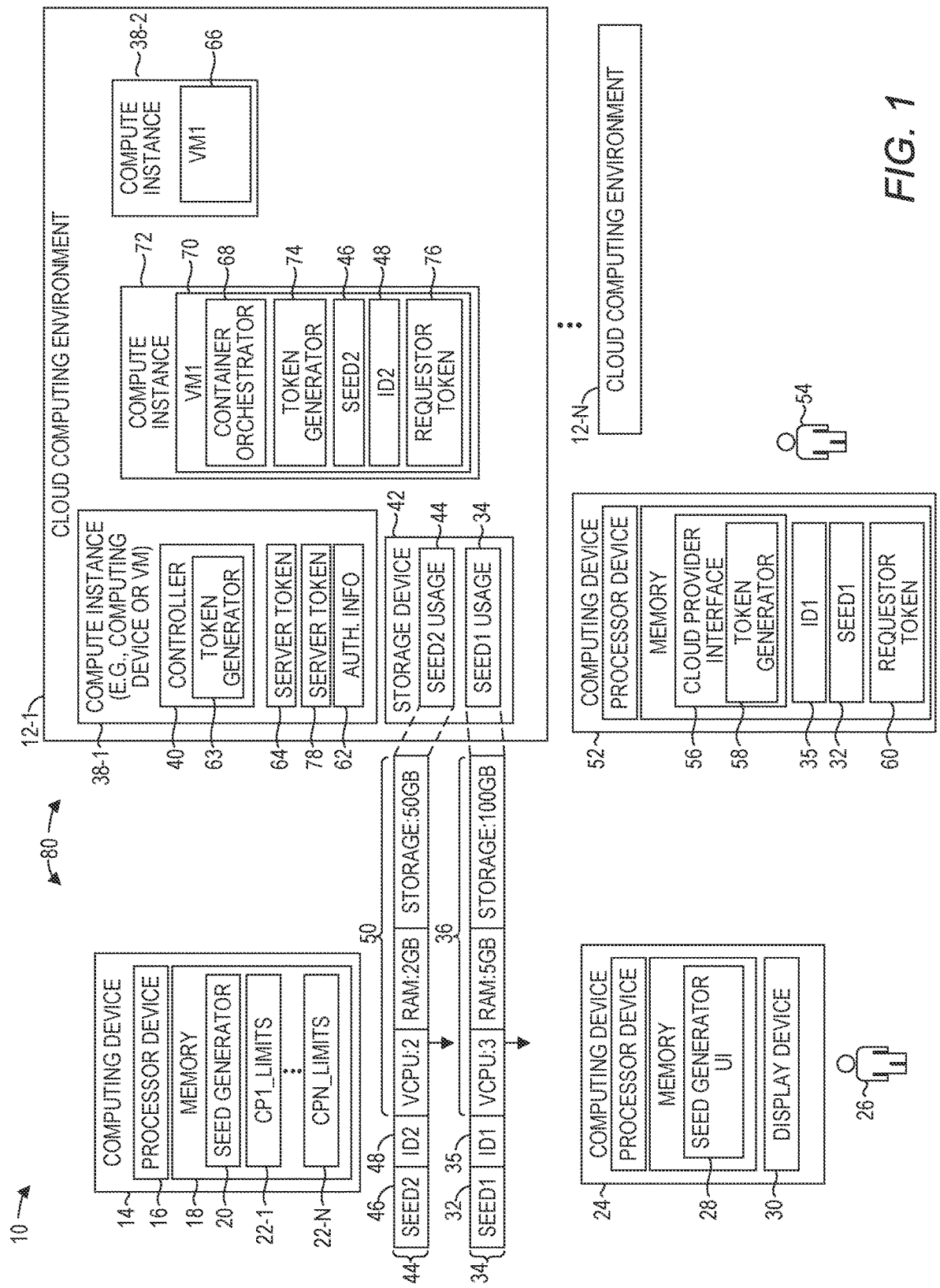
FIG. 1 illustrates a block diagram of an environment suitable for implementing computing resource usage control using seed and token generation according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Shared computing environments, such as a cloud computing environment, may have different resource usage limitations for different tenants of the cloud computing environment. As an example, a tenant may be limited to a certain number of computing elements, such as a particular number of virtual machines or containers. As another example, a tenant may be limited to a predetermined amount of memory, central processing units (CPUs), virtual CPUs, or data storage. Moreover, a tenant may wish to implement different resource usage limitations for different users associated with the tenant. For example, a tenant may want software developers to utilize no more than a certain amount of computing resources, and may want production users to utilize a different amount of computing resources. An ability to limit certain users to certain computing resources in a shared computing environment in a secure manner may be desirable.

The examples disclosed herein implement computing resource usage control using seed and token generation. A computing system stores a seed and computing resource usage limitations associated with the seed. The computing resource usage limitations are in the form of one or more computing resource characteristics, such as a memory, a central processing unit, or the like, and corresponding computing resource permitted conditions, such as 3 gigabytes (GB) of memory, two virtual CPUs, 10 GB storage, or the like.

The computing system subsequently receives a request from a requestor to implement a computing element, such as a virtual machine, a container, a computing process, or the like that utilizes a particular computing resource characteristic. The request includes a computing resource value for the computing resource characteristic.

The requestor generates, using the seed, a requestor token, and provides the requestor token to the computing system. The computing system generates, using the seed, a server token. If the server token does not match the requestor token, the request is denied. If the server token does match the requestor token, the computing system determines whether the computing resource value meets the computing resource permitted condition that corresponds to the computing resource characteristic. If so, the computing system grants the request. If not, the computing system denies the request.

FIG. 1 is a block diagram of an environment 10 suitable for implementing computing resource usage control using seed and token generation according to one implementation. The environment 10 includes a plurality of cloud computing environments 12-1-12-N (generally, cloud computing environments 12). Although the examples will be discussed in the context of a cloud computing environment, the implementations disclosed herein have applicability in any computing environment wherein secure computing resource usage control is desired.

The environment 10 includes a computing device 14 that includes a processor device 16 and a memory 18. The memory 18 includes a seed generator 20 and, in this implementation, a plurality of cloud provider usage limitations 22-1-22-N (generally, cloud provider usage limitations 22). Each cloud provider usage limitation 22 identifies certain maximum computing resource values that may be allocated to a computing element implemented in the respective cloud computing environment 12. While the computing device 14 is illustrated as being outside the cloud computing environments 12, in some implementations, each cloud computing environment 12 may implement a separate seed generator 20, and the seed generator 20 may execute on a compute instance, such as a bare metal machine or a virtual machine (VM), that operates in the respective cloud computing environment 12.

The environment 10 includes a computing device 24 used by an administrator 26 to interact with the seed generator 20. In particular, the administrator 26 may interact with a seed generator user interface (UI) 28 that communicate with the seed generator 20. The seed generator UI 28 may obtain, from the seed generator 20, a list of the cloud computing environments 12, and present cloud computing environment identifiers that correspond to the cloud computing environments 12 on a display device 30. The administrator 26 may select a cloud computing environment identifier, and in response, the seed generator UI 28 obtains, from the seed generator 20, the cloud provider usage limitations 22 that correspond to the selected cloud computing environment identifier.

For purposes of illustration, assume that the administrator 26 selects a cloud computing environment identifier that corresponds to the cloud computing environment 12-1, and in response, the seed generator UI 28 obtains and presents the cloud provider usage limitations 22-1 on the display device 30. The cloud provider usage limitations 22-1 may identify a plurality of computing resource characteristics, such as memory, CPU, and storage. The computing resource characteristics may also include computing elements, such as virtual machines, containers, computing processes, and the like. The cloud provider usage limitations 22-1 may also identify, for each computing resource characteristic, a maximum computing resource value that can be selected for the computing resource characteristic. For example, the cloud provider usage limitations 22-1 may indicate that the administrator 26 may allow a maximum memory allocation of six gigabytes (GB), a maximum storage utilization of 100 GB, and a maximum virtual CPU allocation of six. The maximum computing resource value may be on a per-request basis, or per seed.

The administrator 26 may utilize this information to identify a plurality of computing resource characteristics and corresponding computing resource permitted conditions. In this example, the administrator 26 identifies a virtual CPU computing resource characteristic and a corresponding computing resource permitted condition of three or fewer, such that a request to implement a computing element cannot request a maximum quantity of three virtual CPUs. The administrator 26 identifies a memory computing resource characteristic and a corresponding computing resource permitted condition of 5 GB, such that a request to implement a computing element can request a maximum quantity of 5 GB of memory. The administrator 26 identifies a storage computing resource characteristic and a corresponding computing resource permitted condition of 100 GB, such that a request to implement a computing element cannot request a quantity of storage greater than 100 GB.

The seed generator UI 28 communicates the plurality of computing resource characteristics and corresponding computing resource permitted conditions to the seed generator 20 along with a request to generate a seed and associate the plurality of computing resource characteristics and corresponding computing resource permitted conditions with the generated seed. The seed generator 20 receives the information, and generates a seed 32. The seed 32 is a unique identifier, such as, by way of non-limiting example, a unique 64-, 128- or 256-bit value. The seed generator 20 generates a seed usage entry 34 that includes the seed 32, a unique identifier (ID) 35, and the identified plurality of computing resource characteristics and corresponding computing resource permitted conditions 36. The seed generator 20 provides the seed usage entry 34 to the computing device 24.

The cloud computing environment 12-1 includes a compute instance 38-1. The term "compute instance," as discussed herein, refers to a discrete runtime environment, and may comprise a physical machine configured to run an operating system, or may comprise a virtual machine that emulates a physical machine. A virtual machine typically runs a guest operating system in conjunction with a virtual machine monitor, such as a hypervisor, that is configured to coordinate access to physical resources of a physical machine, such as a memory and a processor device, by the virtual machines running on the physical machine. A compute instance thus, whether a physical machine or a virtual machine, includes a memory and a processor device.

The compute instance 38-1 includes a controller 40. The administrator 26 causes the computing device 24 to send the seed usage entry 34 to the controller 40, which may then store the seed usage entry 34 in a storage device 42 for subsequent access, as discussed in greater detail below.

In this example, the administrator 26 may repeat the process described again to cause the seed generator 20 to generate another seed usage entry 44 that has different computing resource permitted conditions than that identified in the seed usage entry 34. In particular, the administrator 26 interacts with the seed generator UI 28 to cause the seed generator 20 to generate a seed 46, a unique ID 48, and that has associated computing resource characteristics and corresponding computing resource permitted conditions 50. The administrator 26 causes the computing device 24 to send the seed usage entry 44 to the controller 40, which stores the seed usage entry 44 in the storage device 42.

The administrator 26 may also distribute the seed 32 and the unique ID 35 to a computing device 52 associated with a user 54. For purposes of illustration, assume that the user 54 desires to implement a computing element, such as a virtual machine, in the cloud computing environment 12-1. The user 54 interacts with a cloud provider interface 56 to generate a request to implement, in the cloud computing environment 12-1, a virtual machine having two virtual CPUs, five GB of memory, and that can utilize up to 50 GB of storage.

The cloud provider interface 56 includes, or interacts with, a token generator 58 that utilizes a token generating algorithm that operates to generate a token based on a seed. In this example, the cloud provider interface 56 provides the seed 32 to the token generator 58. The token generator 58 generates a requestor token 60. The cloud provider interface 56 generates a request to implement, in the cloud computing environment 12-1, a virtual machine. The request identifies certain computing resource characteristics, and for each such computing resource characteristic, a corresponding computing resource value.

In this example, the computing resource characteristics include a virtual CPU computing resource characteristic that has a corresponding computing resource value of two virtual CPUs, a memory computing resource characteristic that has a corresponding computing resource value of five GB of memory, and a storage computing resource characteristic that has a corresponding computing resource value of 50 GB of storage. The request includes the unique ID 35 and the requestor token 60. In some implementations, the unique ID 35 may comprise authentication information associated with the user 54, such as a user identifier and a password. The cloud provider interface 56 sends the request to the controller 40.

The controller 40 receives the request. The controller 40 determines, based on the unique ID 35, that the seed usage entry 34 is associated with the request. In some implementations where the unique ID 35 comprises authentication credentials, such as a user identifier and a password, the controller 40 may first access authentication information 62 to determine whether the authentication credentials are valid. If not, the controller 40 may deny or otherwise reject the request. If the authentication credentials are valid, the controller 40 accesses the seed usage entry 34 to obtain the seed 32, and provides the seed 32 to a token generator 63 that utilizes the same token generating algorithm as that of the token generator 58. Based on the seed 32, the token generator 63 generates a server token 64. If the requestor token 60 was generated using a different seed than the seed 32, or was generated using a different token generating algorithm, then the server token 64 will not match the requestor token 60. In this example, the controller 40 determines that the requestor token 60 matches the server token 64. In some implementations, the tokens generated by the token generator algorithms may be time-limited, such that each generated token has a determined lifespan, such as 10 seconds, 30 seconds, or the like. In such implementations, if the lifespan of the requestor token 60 has terminated prior to the generation of the server token 64, then the server token 64 and the requestor token 60 will not match, and the controller 40 will deny the request.

In this implementation, the controller 40 has determined that both authentication steps have been valid, that of the authentication credentials and that of the requestor token 60. The controller 40 then accesses the plurality of computing resource characteristics and corresponding computing resource permitted conditions 36 of the seed usage entry 34 and determines that the computing resource values within the request meet the corresponding computing resource permitted conditions. The controller 40 thus grants the request, and may then automatically cause a virtual machine 66 to be initiated on a compute instance 38-2 that has two virtual CPUs, five GB of memory, and can utilize up to 50 GB of memory.

As another example of computing resource usage control using seed and token generation, assume that the seed 46 and the identifier 48 are provided to a container orchestrator 68 executing in a virtual machine 70 of a compute instance 72. The container orchestrator 68 determines that a new container should be initiated.

The container orchestrator 68 includes, or interacts with, a token generator 74 that utilizes the same token generating algorithm as the token generator 63. The container orchestrator 68 provides the seed 46 to the token generator 74. The token generator 74 generates a requestor token 76. The container orchestrator 68 generates a request to implement, in the cloud computing environment 12-1, a container. The request identifies certain computing resource characteristics and, for each such computing resource characteristic, a corresponding computing resource value.

In this example, the computing resource characteristics include a memory computing resource characteristic that has a corresponding computing resource value of 1.5 GB of memory, and a storage computing resource characteristic that has a corresponding computing resource value of 5 GB of storage. The request includes the unique ID 48 and the requestor token 76. The container orchestrator 68 sends the request to the controller 40.

The controller 40 receives the request. The controller 40 determines, based on the unique ID 48, that the seed usage entry 44 is associated with the request. The controller 40 accesses the seed usage entry 44 to obtain the seed 46, and provides the seed 46 to the token generator 63. Based on the seed 46, the token generator 63 generates a server token 78. In this example, the controller 40 determines that the requestor token 76 matches the server token 78. The controller 40 then accesses the plurality of computing resource characteristics and corresponding computing resource permitted conditions 50 of the seed usage entry 44 and determines that the computing resource values within the request from the container orchestrator 68 meet the corresponding computing resource permitted conditions. The controller 40 thus grants the request, and authorizes the container orchestrator 68 to initiate a container.

If any of the computing resource values within the request from the container orchestrator 68 did not meet the corresponding computing resource permitted conditions of the seed usage entry 44, the controller 40 would deny the request to initiate a new container.

The container orchestrator 68 and the cloud provider interface 56, in response to inputs from the user 54, may repeatedly submit new requests to the controller 40, following the processes described above. In this manner, the administrator 26 can generate any number of seeds and associated computing resource characteristics and corresponding computing resource permitted conditions, distribute such seeds as desired or suitable to control computing resource usage in any number of cloud computing environments.

It is noted that, because the controller 40 is a component of the compute instance 38-1, functionality implemented by the controller 40 may be attributed to the compute instance 38-1, whether the compute instance 38-1 is a bare metal computing device or a virtual machine. Moreover, in examples where the controller 40 comprises software instructions that program a processor device to carry out functionality discussed herein, functionality implemented by the controller 40 may be attributed herein to one or more processor devices.

It is further noted that the functionality described herein may be implemented by a single compute instance, or the functionality may be distributed across any number of compute instances. Thus, the functionality may be implemented by a computing system 80 that comprises one or more processor devices of one or more computing devices.

Figure 2:
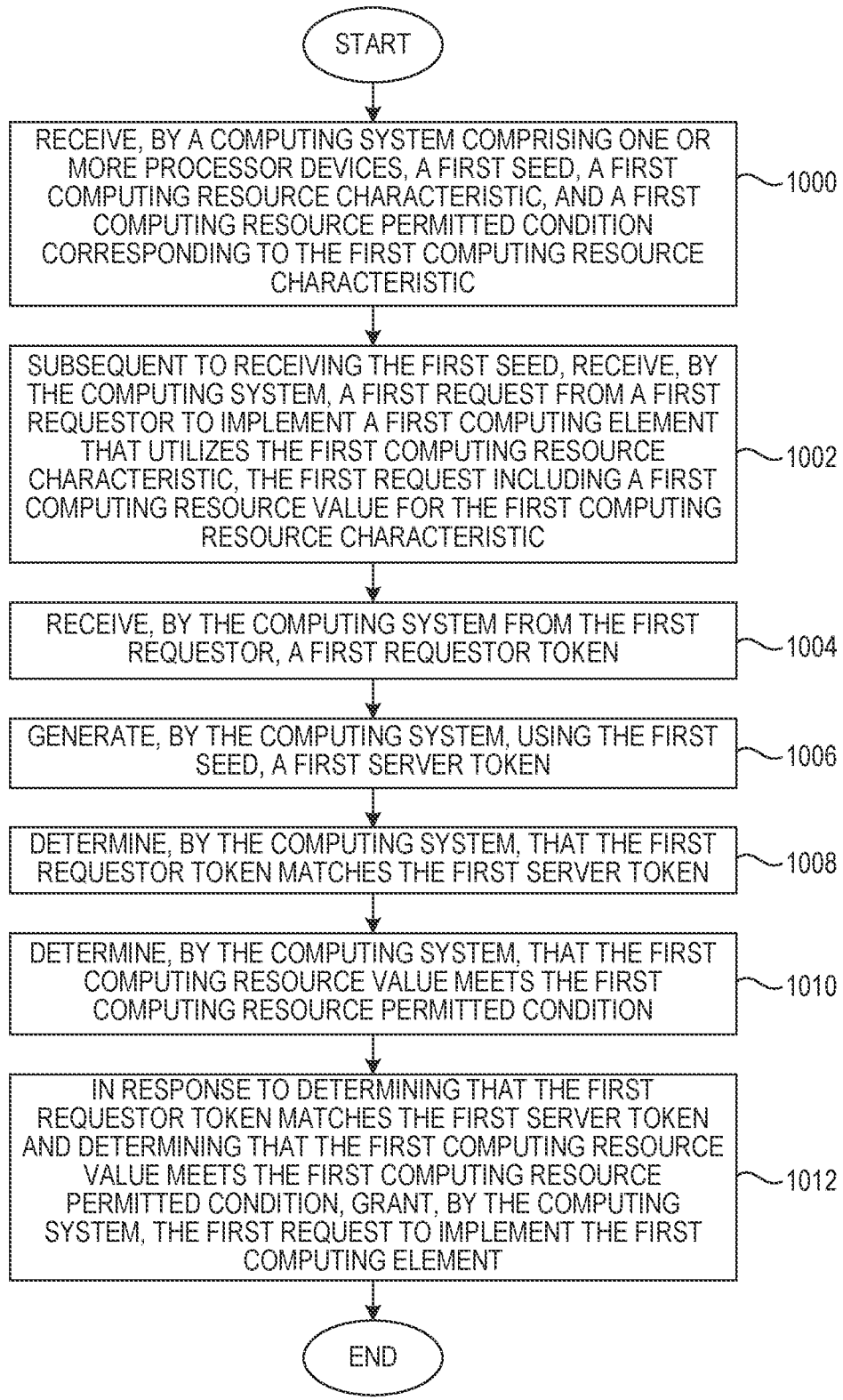
FIG. 2 illustrates a flowchart of a method for implementing computing resource usage control using seed and token generation according to one implementation.

FIG. 2 illustrates a flowchart of a method for implementing computing resource usage control using seed and token generation according to one implementation. FIG. 2 will be discussed in conjunction with FIG. 1. The computing system 80 receives the seed 46, the computing resource characteristics and the corresponding computing resource permitted conditions 50 (FIG. 2, block 1000).

The computing system 80, subsequent to receiving the first seed, receives a request from a requestor, such as the cloud provider interface 56, or the container orchestrator 68, to implement a computing element, such as a VM or a container, that utilizes a computing resource characteristic, the request including a computing resource value for the computing resource characteristic (FIG. 2, block 1002). The computing system 80 receives, from the cloud provider interface 56, the requestor token 60 (FIG. 2, block 1004). The computing system 80 generates, using the seed 32, the server token 64 (FIG. 2, block 1006). The computing system 80 determines that the requestor token 60 matches the server token 64 (FIG. 2, block 1008). The computing system 80 determines that the computing resource values meet the computing resource permitted conditions contained in the request (FIG. 2, block 1010). The computing system 80, in response to determining that the requestor token 76 matches the server token 64 and determining that the computing resource values meet the computing resource permitted conditions, grants the request to implement the computing element (FIG. 2, block 1012).

Figure 3:
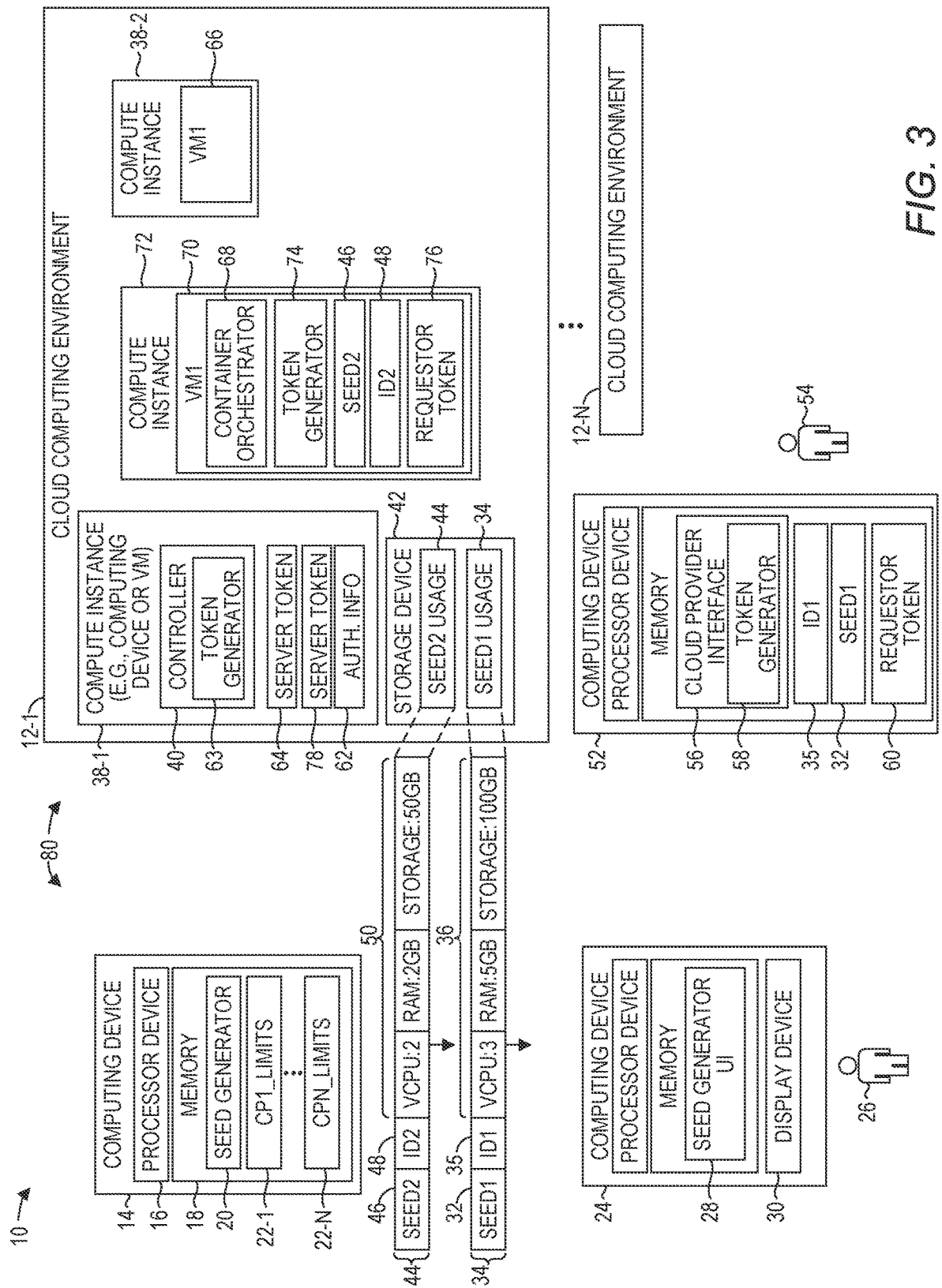
FIG. 3 is a simplified block diagram of FIG. 1 according to one implementation.

FIG. 3 is a simplified block diagram of FIG. 1 according to one implementation. The environment 10 includes the computing system 80, which in turn includes one or more processor devices of one or more computing devices. The one or more processor devices are to receive the seed 32, a computing resource characteristic, and a corresponding computing resource permitted condition. Subsequent to receiving the first seed, the one or more processor devices are to receive a request from a requestor, such as the computing device 24, to implement a computing element, such as a virtual machine, that utilizes the computing resource characteristic, the request including a computing resource value for the computing resource characteristic. The one or more processor devices are further to receive, from the requestor, the requestor token 60. The one or more processor devices are further to generate, using the seed 32, the server token 64. The one or more processor devices are further to determine that the requestor token 60 matches the server token 64. The one or more processor devices are further to determine that the computing resource value meets the computing resource permitted condition. The one or more processor devices are further to, in response to determining that the requestor token 60 matches the server token 64 and determining that the computing resource value meets the computing resource permitted condition, grant the request to implement the computing element.

Figure 4:
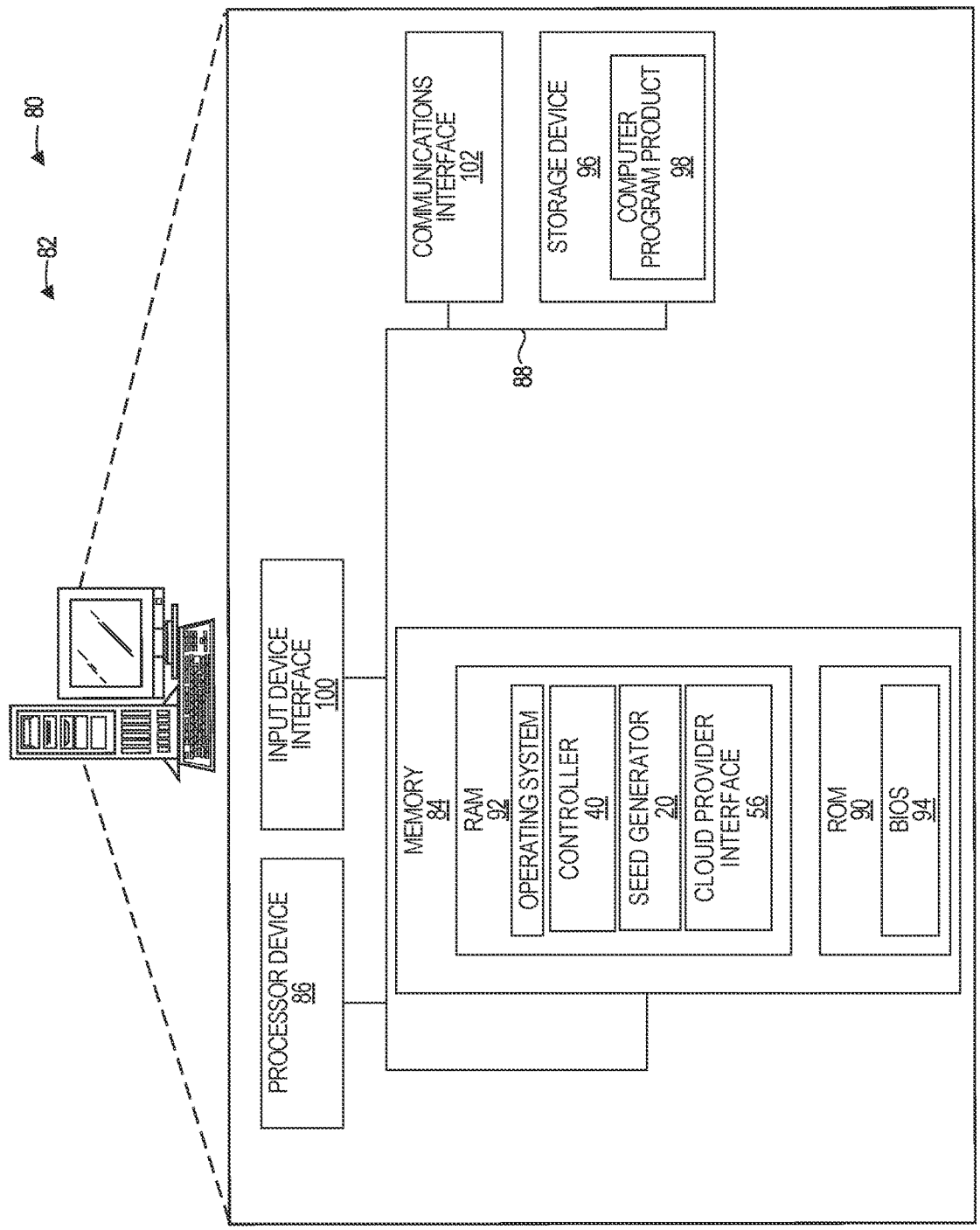
FIG. 4 is a block diagram of a computing system suitable for implementing device computing resource usage control using seed and token generation according to one implementation.

FIG. 4 is a block diagram of the computing system 80 suitable for implementing examples according to one example. The computing system 80 may comprise any computing or electronic devices capable of including firmware, hardware, and/or executing software instructions to implement the functionality described herein, such as one or more computer servers, one or more virtual machines, or the like. The computing system 80 includes one or more computing devices 82, each of which includes a memory 84, one or more processor devices 86, and a system bus 88. The system bus 88 provides an interface for system components including, but not limited to, the memory 84 and the one or more processor devices 86. The one or more processor devices 86 can be any commercially available or proprietary processor.

The system bus 88 may be any of several types of bus structures that may further interconnect to a memory bus (with or without a memory controller), a peripheral bus, and/or a local bus using any of a variety of commercially available bus architectures. The memory 84 may include non-volatile memory 90 (e.g., read-only memory (ROM), erasable programmable read-only memory (EPROM), electrically erasable programmable read-only memory (EEPROM), etc.), and volatile memory 92 (e.g., random-access memory (RAM)). A basic input/output system (BIOS) 94 may be stored in the non-volatile memory 90 and can include the basic routines that help to transfer information between elements within the computing system 80. The volatile memory 92 may also include a high-speed RAM, such as static RAM, for caching data.

The computing system 80 may further include or be coupled to a non-transitory computer-readable storage medium such as a storage device 96, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 96 and other drives associated with computer-readable media and computer-usable media may provide non-volatile storage of data, data structures, computer-executable instructions, and the like.

A number of modules can be stored in the storage device 96 and in the volatile memory 92, including an operating system and one or more program modules, such as the controller 40, the seed generator 20, and/or the cloud provider interface 56, which collectively may implement the functionality described herein in whole or in part. All or a portion of the examples may be implemented as a computer program product 98 stored on a transitory or non-transitory computer-usable or computer-readable storage medium, such as the storage device 96, which includes complex programming instructions, such as complex computer-readable program code, to cause the one or more processor devices 86 to carry out the steps described herein. Thus, the computer-readable program code can comprise software instructions for implementing the functionality of the examples described herein when executed on the one or more processor devices 86.

A user may also be able to enter one or more configuration commands through a keyboard (not illustrated), a pointing device such as a mouse (not illustrated), or a touch-sensitive surface such as a display device. Such input devices may be connected to the one or more processor devices 86 through an input device interface 100 that is coupled to the system bus 88 but can be connected by other interfaces such as a parallel port, an Institute of Electrical and Electronic Engineers (IEEE) 1394 serial port, a Universal Serial Bus (USB) port, an IR interface, and the like. The computing system 80 may also include a communications interface 102 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a computing system comprising one or more processor devices, a first seed, a first computing resource characteristic, and a first computing resource permitted condition corresponding to the first computing resource characteristic;
   subsequent to receiving the first seed, receiving, by the computing system, a first request from a first requestor to implement a first computing element that utilizes the first computing resource characteristic, the first request including a first computing resource value for the first computing resource characteristic;
   receiving, by the computing system from the first requestor, a first requestor token;
   generating, by the computing system, using the first seed, a first server token;
   determining, by the computing system, that the first requestor token matches the first server token;
   determining, by the computing system, that the first computing resource value meets the first computing resource permitted condition; and
   in response to determining that the first requestor token matches the first server token and determining that the first computing resource value meets the first computing resource permitted condition, granting, by the computing system, the first request to implement the first computing element.

2. The method of claim 1 wherein the first computing resource characteristic comprises one of a central processing unit (CPU), a memory, a storage, a computing element, and a virtual CPU.

3. The method of claim 1 wherein the first computing resource permitted condition comprises a maximum quantity.

4. The method of claim 1 wherein the first computing element comprises one of a virtual machine, a container, and a computing process.

5. The method of claim 1 further comprising:
   receiving, by the computing system, a plurality of seeds including the first seed; for each seed of the plurality of seeds, a corresponding computing resource characteristic; and for each computing resource characteristic, a corresponding computing resource permitted condition; and
   storing each seed, the corresponding computing resource characteristic, and the corresponding computing resource permitted condition in association with one another.

6. The method of claim 5 further comprising:
   receiving, by the computing system, a second request from a second requestor to implement a second computing element that utilizes a second computing resource characteristic, the second request including a second computing resource value for the second computing resource characteristic;
   receiving, by the computing system from the second requestor, a second requestor token;
   generating, by the computing system, using a second seed associated with the second requestor, a second server token;
   determining, by the computing system, that the second requestor token matches the second server token;
   determining, by the computing system, that the second computing resource value does not meet the second computing resource permitted condition; and
   in response to determining that the second computing resource value does not meet the second computing resource permitted condition, denying, by the computing system, the second request to implement the second computing element.

7. The method of claim 5 further comprising:
   receiving, by the computing system, a second request from a second requestor to implement a second computing element that utilizes a second computing resource characteristic, the second request including a second computing resource value for the second computing resource characteristic;

receiving, by the computing system from the second requestor, a second requestor token;
generating, by the computing system, using a second seed associated with the second requestor, a second server token;
determining, by the computing system, that the second requestor token does not match the second server token; and
in response to determining that the second requestor token does not match the second server token, denying, by the computing system, the second request to implement the second computing element.

8. The method of claim 1 further comprising:
receiving, by the computing system from the first requestor, a user identifier and a password; and
determining, based on authentication information, that the user identifier and the password are valid.

9. The method of claim 1 further comprising:
subsequent to granting the first request, receiving, by the computing system, a second request from the first requestor to implement a second computing element that utilizes the first computing resource characteristic, the second request including a second computing resource value for the first computing resource characteristic, the second computing resource value being different from the first computing resource value;
receiving, by the computing system from the first requestor, a second requestor token;
generating, by the computing system, using the first seed, a second server token, the second server token being different from the first server token;
determining, by the computing system, that the second requestor token matches the second server token;
determining, by the computing system, that the second computing resource value meets the first computing resource permitted condition; and
in response to determining that the second requestor token matches the second server token and determining that the second computing resource value meets the first computing resource permitted condition, granting, by the computing system, the second request to implement the second computing element.

10. The method of claim 1 further comprising:
receiving, by the computing system, a request to generate a seed, the request including the first computing resource characteristic, and the first computing resource permitted condition corresponding to the first computing resource characteristic;
generating the first seed; and
sending the first seed, the first computing resource characteristic, and the first computing resource permitted condition to a destination.

11. The method of claim 1 wherein the computing system comprises a cloud computing environment.

12. A computer system comprising:
one or more processor devices of one or more computing devices, the one or more processor devices to:
receive a first seed, a first computing resource characteristic, and a first computing resource permitted condition corresponding to the first computing resource characteristic;
subsequent to receiving the first seed, receive a first request from a first requestor to implement a first computing element that utilizes the first computing resource characteristic, the first request including a first computing resource value for the first computing resource characteristic;
receive, from the first requestor, a first requestor token;
generate, using the first seed, a first server token;
determine that the first requestor token matches the first server token;
determine that the first computing resource value meets the first computing resource permitted condition; and
in response to determining that the first requestor token matches the first server token and determining that the first computing resource value meets the first computing resource permitted condition, grant the first request to implement the first computing element.

13. The computer system of claim 12 wherein the one or more processors are further to:
receive a plurality of seeds including the first seed; for each seed of the plurality of seeds, a corresponding computing resource characteristic; and for each computing resource characteristic, a corresponding computing resource permitted condition; and
store each seed, the corresponding computing resource characteristic, and the corresponding computing resource permitted condition in association with one another.

14. The computer system of claim 13 wherein the one or more processors are further to:
receive a second request from a second requestor to implement a second computing element that utilizes a second computing resource characteristic, the second request including a second computing resource value for the second computing resource characteristic;
receive, from the second requestor, a second requestor token;
generate, using a second seed associated with the second requestor, a second server token;
determine that the second requestor token matches the second server token;
determine that the second computing resource value does not meet the second computing resource permitted condition; and
in response to determining that the second computing resource value does not meet the second computing resource permitted condition, deny the second request to implement the second computing element.

15. The computer system of claim 13 wherein the one or more processors are further to:
receive a second request from a second requestor to implement a second computing element that utilizes a second computing resource characteristic, the second request including a second computing resource value for the second computing resource characteristic;
receive, from the second requestor, a second requestor token;
generate, using a second seed associated with the second requestor, a second server token;
determine that the second requestor token does not match the second server token; and
in response to determining that the second requestor token does not match the second server token, deny the second request to implement the second computing element.

16. The computer system of claim 12 wherein the one or more processors are further to:
receive, from the first requestor, a user identifier and a password; and
determine, based on authentication information, that the user identifier and the password are valid.

17. A non-transitory computer-readable storage medium that includes executable instructions to cause one or more processor devices of one or more computing devices to:
  receive a first seed, a first computing resource characteristic, and a first computing resource permitted condition corresponding to the first computing resource characteristic;
  subsequent to receiving the first seed, receive a first request from a first requestor to implement a first computing element that utilizes the first computing resource characteristic, the first request including a first computing resource value for the first computing resource characteristic;
  receive, from the first requestor, a first requestor token;
  generate, using the first seed, a first server token;
  determine that the first requestor token matches the first server token;
  determine that the first computing resource value meets the first computing resource permitted condition; and
  in response to determining that the first requestor token matches the first server token and determining that the first computing resource value meets the first computing resource permitted condition, grant the first request to implement the first computing element.

18. The non-transitory computer-readable storage medium of claim 17 wherein the instructions further cause the one or more processors to:
  receive a plurality of seeds including the first seed; for each seed of the plurality of seeds, a corresponding computing resource characteristic; and for each computing resource characteristic, a corresponding computing resource permitted condition; and
  store each seed, the corresponding computing resource characteristic, and the corresponding computing resource permitted condition in association with one another.

19. The non-transitory computer-readable storage medium of claim 18 wherein the instructions further cause the one or more processors to:
  receive a second request from a second requestor to implement a second computing element that utilizes a second computing resource characteristic, the second request including a second computing resource value for the second computing resource characteristic;
  receive, from the second requestor, a second requestor token;
  generate, using a second seed associated with the second requestor, a second server token;
  determine that the second requestor token matches the second server token;
  determine that the second computing resource value does not meet the second computing resource permitted condition; and
  in response to determining that the second computing resource value does not meet the second computing resource permitted condition, deny the second request to implement the second computing element.

20. The non-transitory computer-readable storage medium of claim 18 wherein the instructions further cause the one or more processors to:
  receive a second request from a second requestor to implement a second computing element that utilizes a second computing resource characteristic, the second request including a second computing resource value for the second computing resource characteristic;
  receive, from the second requestor, a second requestor token;
  generate, using a second seed associated with the second requestor, a second server token;
  determine that the second requestor token does not match the second server token; and
  in response to determining that the second requestor token does not match the second server token, deny the second request to implement the second computing element.

* * * * *